United States Patent [19]

Emrich

[11] 4,452,394
[45] Jun. 5, 1984

[54] SELF PROPELLED IRRIGATION SYSTEMS

[76] Inventor: Robert R. Emrich, Box J, Indianola, Nebr. 69034

[21] Appl. No.: 458,534

[22] Filed: Jan. 17, 1983

Related U.S. Application Data

[62] Division of Ser. No. 129,088, Mar. 10, 1980, Pat. No. 4,368,848.

[51] Int. Cl.$^3$ .............................................. A01G 25/09
[52] U.S. Cl. ................................. 239/177 R; 239/721; 239/DIG. 1
[58] Field of Search ................ 239/177, DIG. 1, 709, 239/710, 718–721

[56] References Cited

U.S. PATENT DOCUMENTS

| | | | |
|---|---|---|---|
| 3,157,193 | 11/1964 | Purtell | 239/721 X |
| 3,623,663 | 11/1971 | Koinzan | 239/177 |
| 3,780,947 | 12/1973 | Ririe et al. | 239/177 |

Primary Examiner—Andres Kashnikow
Attorney, Agent, or Firm—Zarley, McKee, Thomte, Voorhees & Sease

[57] ABSTRACT

An improved center pivot irrigation system is disclosed which uses a water driven turbine and a chain drive apparatus to propel the system. Mechanical devices are used for sensing the alignment of the pipeline and actuating the turbine. A cam and cable arrangement is used to actuate an end gun. Safety stop and automatic shut off devices are also disclosed.

5 Claims, 11 Drawing Figures

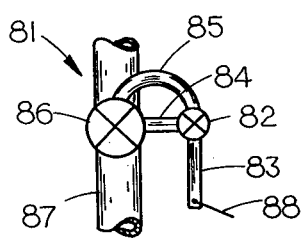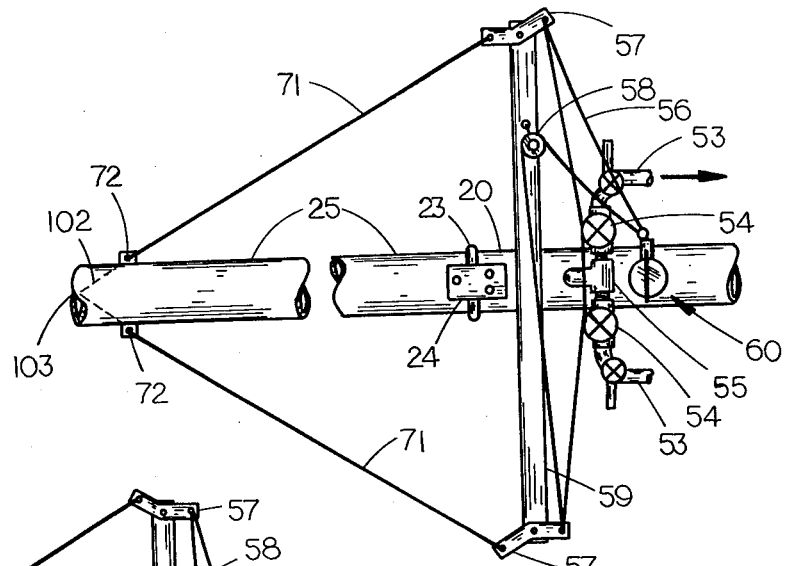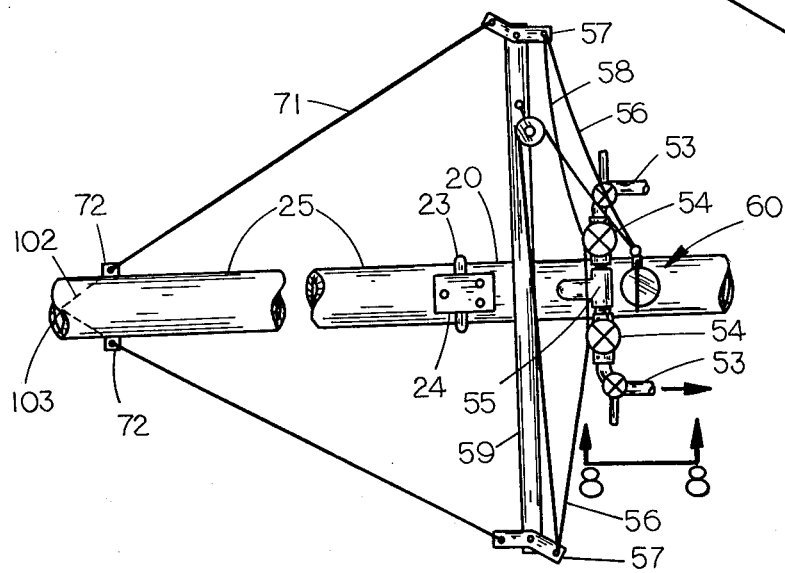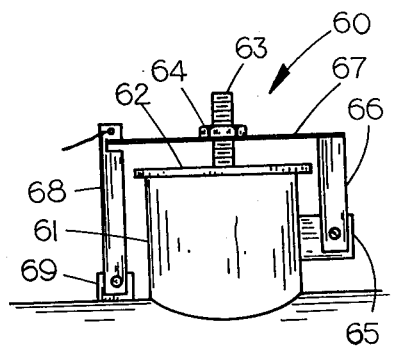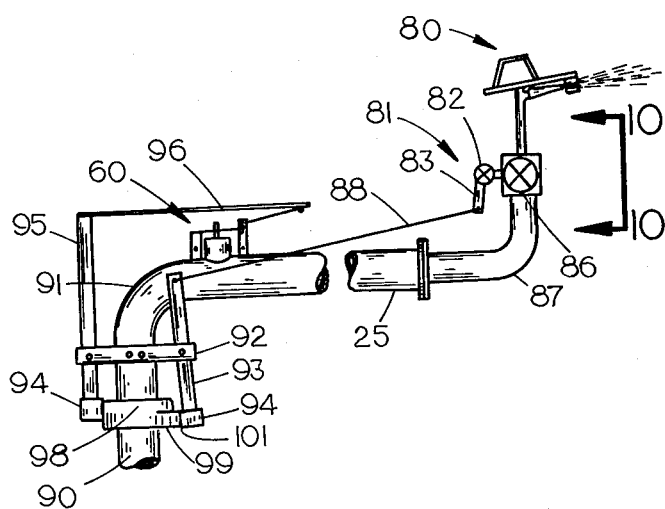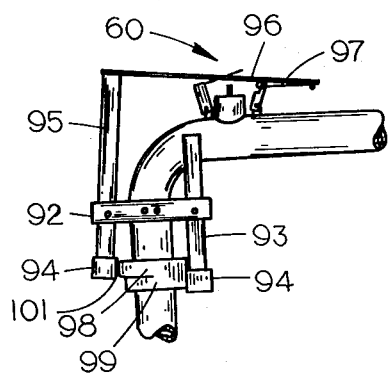

SELF PROPELLED IRRIGATION SYSTEMS

This application is a division of application Ser. No. 129,088, filed Mar. 10, 1980 now U.S. Pat. No. 4,368,848.

BACKGROUND OF THE INVENTION

This invention relates generally to self propelled irrigation systems and more particularly to self propelled center pivot irrigation systems.

In areas where large sections of land must be irrigated to be productive various sprinkler arrangements have proven to be the most effective in many situations. In recent years it has been found that the most inexpensive and effective of these sprinker irrigation systems has been the self propelled center pivot systems. In this type of system the fixed center pivot is connected to a radially extended irrigation pipeline. The pipeline is mounted on a series of wheel mounted moveable carriages at intervals of several rods. The carriages act as support for the irrigation pipeline and also propel the pipeline around a circular path. Generally the moveable carriage which is at the farthest end of the pipeline is in continuous motion and the remaining carriages are moved only when they are sufficiently out of line with the next more radially remote carriage. The carriages are generally propelled by electrical drive motors which are actuated by an alignment sensing means. The alignment sensing means is usually an electrical stress gauge or similar electrical device which measures the deflection of the pipeline from the normal perpendicular alignment.

The advantages of a self propelled system over manually moved irrigation pipes is quite obvious. The primary advantage of a self propelled center pivot irrigation system over self propelled linear irrigation systems is, of course, a reduction in the length of pipeline and a reduction in the number of motor driven carriages necessary to cover the same amount of ground. However, an inherent disadvantage of the center pivot irrigation system when working on noncircular fields is that the corner sections of the field tend not to receive any irrigation water. Another problem which needs to be overcome is the disturbance of the land caused by the carriages. The weight of the electrical motors and reduction gear accentuates this problem. An associated problem having to do with the use of electrical motors and electrical alignment devices generally is the expense of this equipment and the danger of severe electrical shock caused by using electrical apparatus under wet conditions.

A great number of patents have been issued dealing with these and other problems associated with center pivot irrigation systems.

Reinke U.S. Pat. No. 3,912,170 describes the use of light weight aluminum irrigation pipe in center pivot irrigation systems wherein steel support wires are used to give the system the necessary structural strength.

Reinke U.S. Pat. No. 3,623,662 discloses the center pivot irrigation system using a worm gear drive assembly for driving the moveable carriages and also discloses an alignment sensing means whereby an electric circuit is completed by the deflection of an irrigation pipe connection plate which actuates an electric drive motor.

Kricher et al U.S. Pat. No. 3,797,517 and Seckler et al U.S. Pat. No. 3,802,627 disclose a self propelled irrigation apparatus for watering noncircular areas wherein a carriage supported deflection arm is pivoted on the main irrigation pipeline. Stress gauges and a computer operated angle encoder are used to control movement of the deflection arm to water noncircular portions of a field.

Reinke U.S. Pat. No. 3,608,826 and Reinke U.S. Pat. No. 3,750,953 both disclose the use of a cam actuated end gun for irrigating the corners of noncircular fields. A cam device mounted near the center pivot opens a control circuit which actuates a solenoid valve to provide water to the end gun.

Zybach U.S. Pat. No. 2,941,727 discloses a float operated water flow sensing device which may be situated at a number of positions along the pipeline which uses a mercury switch for activating a control circuit to turn off the pump during low flow conditions at any point along the pipeline. A water actuated piston cylinder drive means is also disclosed. Use of a wire connected to one side of an irrigation pipe and also connected to a moveable carriage as an alignment sensing means is also disclosed.

Although the above cited art represents an advance over prior art a number of the more important problems remain unsolved. An effective drive means for the moveable carriages which does not employ expensive and heavy electrical motors has not yet been disclosed. The water piston device disclosed by Zybach involves a number of complicated and expensive moving parts which will present a maintenance problem. The water piston device is also extremely heavy adding to the compaction problems already present in the motor driven carriages. The computer operated pivot arm of Kricher and Seckler offers an overly complicated and expensive method of providing water to the noncircular corners of fields. Although the solenoid actuated end gun of Reinke provides a preferable solution to the watering of corners in a field, the undesirable feature of having an electric cable stretching along the length of the pipe remains uncorrected. Another problem which needs to be addressed is a need for safety devices to stop the operation of carriages when misalignment becomes sufficient to cause damage to the irrigation pipeline.

SUMMARY OF THE INVENTION

The improved center pivot irrigation system of the present invention incorporates the use of water driven turbine wheels to power the individual moveable carriages. A light weight chain drive means increases the traction of the carriage wheels and generally decreases the weight of the irrigation system. Mechanically operated alignment sensing means, end guns, and automatic shut off devices, add to the safety and efficiency of the system without incurring the cost, danger and other disadvantages associated with electrically operated components.

Accordingly, it is the primary object of the present invention to provide a water turbine drive means for a self propelled and center pivot irrigation system.

It is a further object of the invention to provide a means for watering the noncircular corners of a field to be used with a center pivot irrigation system.

It is a further object of the invention to provide a cable actuated cam operated end gun to be used with a center pivot irrigation system.

It is a further object of the invention to provide a mechanical alignment sensing control means to be used with self propelled center pivot irrigation system.

It is further object of the invention to provide a dump valve means for preventing damage to irrigation equipment caused by misalignment of the irrigation pipeline to be used with a center pivot irrigation system.

It is a further object of the invention to provide a light weight and efficient chain drive means to be used with a center pivot irrigation system.

It is a further object of the invention to eliminate the need for electrical wires or electrical circuitry at any point along the pipeline of a center pivot irrigation system.

It is a further object of the invention to reduce the danger from electrical shocks caused by electrical circuitry in a self propelled center pivot irrigation system.

It is a further object of the invention to reduce both the initial and maintenance costs of a center pivot irrigation system.

BRIEF DESCRIPTION OF THE DRAWINGS

FIG. 6 is a top view of a center pivot irrigation system alignment sensing control means.

FIG. 7 is a top view of the same alignment sensing control means as in FIG. 6 showing a different operating situation.

FIG. 8 is a detailed side view of FIG. 7 showing a dump valve.

FIG. 9 is a broken side view of a cam actuated prestop system and a cam actuated end gun system.

FIG. 10 is a detailed front view from FIG. 9 showing the end gun control valve system.

FIG. 11 is a side view of the preset cam stop system of FIG. 9 showing the dump valve in an open position.

DESCRIPTION OF THE PREFERRED EMBODIMENT

Figure 1:
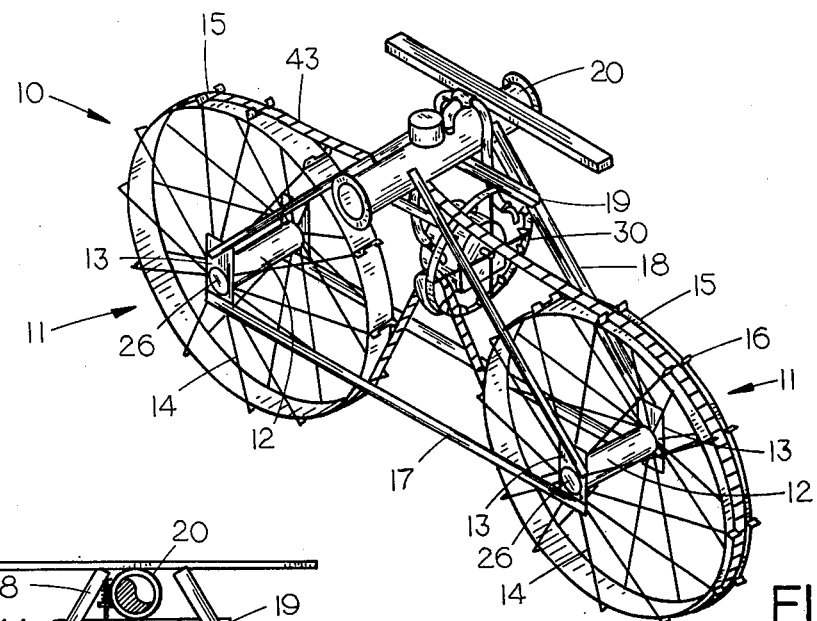
FIG. 1 is a perspective view of a center pivot irrigation system moveable carriage.

It can be seen from FIG. 1 that in the preferred embodiment of the invention the irrigation pipe is supported by a moveable irrigation carriage 10. The carriage 10 has two spoked wheels 11 mounted on a relatively simple frame. Each wheel 11 has a cylindrical metal hub 12 with spokes 14 symetrically attached near each end of the hub 12 by welding or other attachment means well known in the art. A second metal cylinder of greater diameter forms the rim 15 of the wheel 11 to which the spokes 14 are symetrically attached by welding or other means well known in the art. Two rows of metal studs 16 attached to the rim 15 at the outer edges of its periphery, as shown in FIG. 1, provide improved traction for the carriage 10 and act as a guide for the drive chain 43 which will be discussed below. The hub 12 is mounted on a fixed axle 26 about which it freely rotates. The axle 26 is a metal cylinder with an outer diameter slightly smaller than the inner diameter of the hub 12. An axle plate 13 is welded or otherwise rigidly attached by means well known in the art to both ends of the axle 26. Holes of approximately the same diameter as the inner diameter of the axle 26 may be cut through the axle plate 13 with a cutting torch or other cutting means known in the art. The openings through the axle thus provided allows a bar to be inserted for lifting the carriage or moving it manually.

Figure 2:
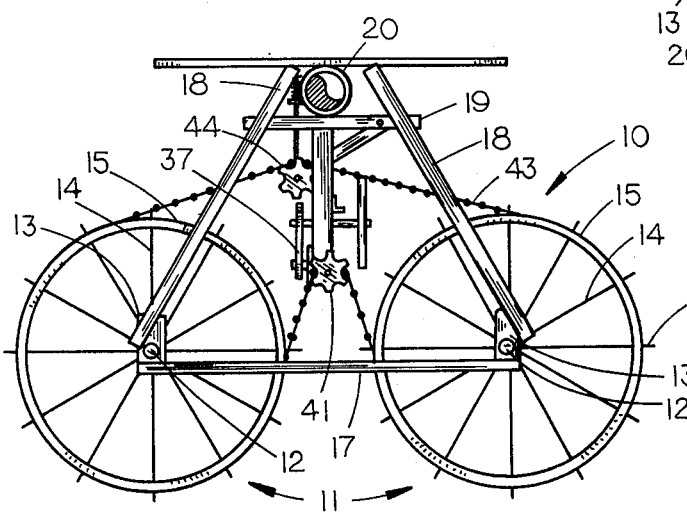
FIG. 2 is a side view of a center pivot irrigation system moveable carriage.

Carriages lower cross brace 17 as shown in FIG. 1 and 2 maintain the spacing between wheels 11 and fix a linear wheel alignment. A cross brace 17 is attached to the axle plates 13 of both wheels 11 on either side of the carriage. The lower cross braces 17 and all brace members discussed hereinafter may be metal bars, angle iron or other suitable structural members. The lower cross braces 17 are welded or bolted to the lower portion of the axle plate outer surface. Diagonal carriage braces 18 provide support for the irrigation pipeline and the turbine drive apparatus 30. The lower ends of the diagonal braces 18 are welded or bolted onto the upper portion of the axle plate 13 outer surface in such a manner that the upper ends of the diagonal members 18 are oriented a few inches apart at the same elevation above the lower cross brace member 17. An upper carriage cross brace member 19 is welded or bolted to the diagonal cross brace members 18 near their upper ends to form a trapezoid shaped figure, as shown in FIG. 2, with a short section of each diagonal member 18 extending above the trapezoid thus formed.

An irrigation pipe connector 20 is supported by the two upper cross braces 19. The short sections of the diagonal cross braces act as restraints to keep the irrigation pipe connector 20 from slipping off the carriage 10 as may be seen from FIGS. 1, 2, and 3. The irrigation pipe connector is attached to the irrigation pipeline 25 at either end by means of connector collar 23 and connector plate 24 as shown in FIGS. 6 and 7.

Figure 4:
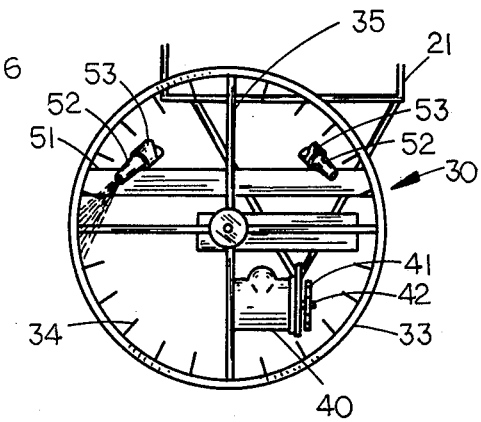
FIG. 4 is a detailed front view of the water driven turbine.
Figure 5:
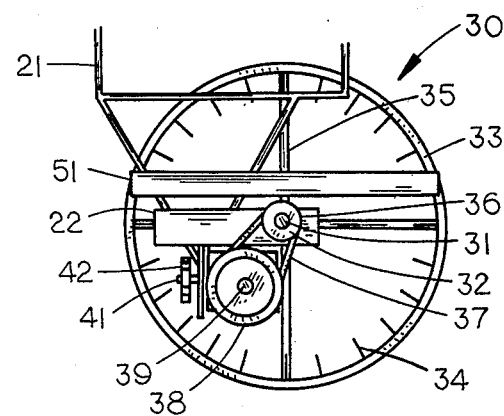
FIG. 5 is a detailed rear view of the water driven turbine.

A turbine support structure 21 consisting of two vertically extending bars attached at the lower ends to a triangular frame as shown in FIGS. 4 and 5. The upper ends of the vertically extending bars of the turbine support structure 21 are bolted or welded to the upper cross braces 19 so that the triangular face of the support structure lies in a place perpendicular to the plane formed by the alignment of the wheels 11 and approximately centered between the wheels 11. A turbine nozzle support member 51 is welded horizontally to the face of the triangular frame near the center of the frame and the turbine horizontal support member is welded horizontally to the face of the triangular frame near the bottom.

Figure 3:
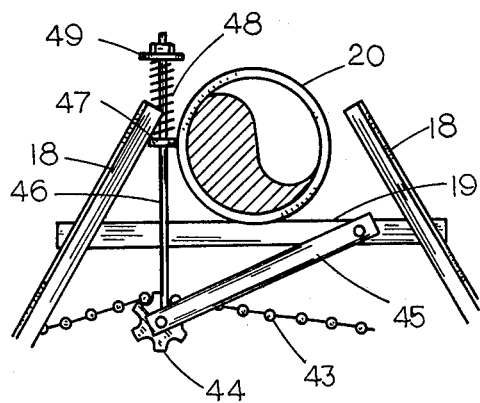
FIG. 3 is a detailed side view showing the drive chain idler wheel assembly.

The turbine drive apparatus consists of a turbine wheel 30 having a circular metal rim 33 with turbine blades 34 mounted by welding or other attachment means known in the art on the inner surface of the rim. The turbine hub 32 is a solid metal cylinder with a hold in the center to accept the turbine axle 31 to which it is rigidly attached by bolting or other attachment means. The turbine rim 33 is connected to the turbine hub 32 by 4 turbine spoke bars 35. The use of a small number of spokes adds to the efficiency of the turbine 30 in that the force of the water may be applied more effectively to the turbine blades 34 when there are fewer spokes to deflect the spray. The turbine axle 31 is journaled to the turbine horizontal support member 32 near its mid point and has a first pulley 36 rigidly attached by conventional means at its opposite end. A conventional drive belt 37 connects the first pulley 36 with a larger pulley 38. The larger pulley 38 is drivingly connected to a reduction gear box 40 by a chain drive sprocket shaft. The reduction ratio from the first pulley 36 to the large pulley 38 is 2½:1. The reduction ratio in the gear reduction box 40 is 220:1. The chain drive sprocket 41 on the gear box shaft 42 engages a chain drive belt 43 about the upper portion of its periphery as shown in FIG. 2. The chain 43 encircles both wheels 11 and is in frictional contact with the wheels 11. As shown in FIG. 3 an idler wheel which is positioned to engage the upper strand of the chain 43 is used to adjust the tension in the chain 43 to provide driving friction against the wheels 11. An idler wheel sprocket 44 is mounted on an idler wheel pivot arm 45 which is pivotally attached to one of the upper horizontal braces 19. An idler wheel tension rod 46 is clamped or welded to the idler wheel axle shaft (not shown). The tension rod 46 passes through a tension rod guide 47 attached to one of the diagonal braces 18. A spring 48 constrained by the tension rod guide 47 and a washer and nut 49 at the top of the rod 46 provides flexibility in the tension device. By screwing the nut 49 down on threading provided at the top of the tension rod 46 the idler wheel 44, is drawn upward thereby tightening the chain 43 and increasing the friction between the chain 43 and the wheels 11. The turbine wheel may be driven in either direction by the selected use of one of the two turbine drive nozzles 52. The turbine drive nozzles 52 are mounted on the turbine nozzle support member 51 by support claims, welding, or other conventional attachment means. The turbine drive nozzles 52 are positioned at opposite ends of the support member 51 and are directed to contact the turbine blades 34 at the proper angle of incidence for maximum driving force. As shown by FIG. 1 and 4 the turbine drive nozzles 52 are operable attached by conventional means to flexible conduit 53. As shown by FIG. 6 and 7 each flexible conduit 53 is in turn connected to a control valve 54. Both control valves 54 are connected by means of a T branch piping section 55 to the irrigation water flow through the irrigation pipe connector 20. The turbine wheel 30 may be driven in either direction by opening the proper control valve 54.

An alignment sensing system which opens and closes the control valves 54 is shown by FIGS. 6 and 7. An alignment wire 71 is attached at either side of an irrigation pipe 25 near the end of the irrigation pipe 25 farther away from the moveable carriage 10 or at lower truss bracket 103, or by other conventional connector means. Both alignment wires 71 are of equal length. Each wire 71 is connected at its opposite end to the first end of alignment control lever arm 57 which is pivotally mounted on an alignment system support member 59. The support member 59 in the preferred embodiment is four to eight feet long and is symetrically attached to the upper surface of irrigation pipe connector 20 perpendicular to the longitudinal axis of connector 20 by welding or other conventional attachment means well known in the art. Each lever arm 57 has a control wire 56 attached to its second end. The control wire 56 is freely moveable through an eyelet of the control arm as shown in FIGS. 6 and 7 or might instead be passed through a pulley (not shown) attached to the end of the lever arm 57. One end of each control wire 56 is connected to one of the control valves and the opposite end of each wire 56 is connected to a dump valve 60. In order to obtain the necessary vector component for tripping the dump valve 60 one of the control wires 56 must be directed through a pulley 58 attached to the support member 59 at a position on the same side of the pipe connector 20 as the dump valve trip arm 68. The control screw (not shown) of each control valve 54 is spring wound to close the valve if no other control force is applied. The control wires 56 are wound to open the control valves 54 when the wire 56 is pulled by the alignment lever arm 57. Trip cable 88 normally is slack and the trip pressure in the dump valve 60 is adjusted to be greater than the pressure necessary to open the control valves 54. The dump valve 60, therefore, will not be tripped while a control valve 54 is being opened. However, when the control wire 56 pressure caused by the deflection of the irrigation pipe 25 reaches a preset limit the dump valve 60 will be tripped releasing the water pressure in the irrigation system. A pressure monitor (not shown) in the irrigation pump (not shown) shuts the pump down in low pressure conditions. The alignment sensing apparatus described above is attached to sense the alignment between a first moveable carriage 10 and the irrigation pipe 25 linking the first carriage 10 with the next more radially remote carriage 10. As the more remote carriage 10 moves with respect to the first carriage 10 the displacement causes an alignment sensing wire to be pulled opposite the direction of carriage 10 motion. The alignment sensing wire 71 displaces alignment lever arm 57 in turn displacing control wire 56 which opens one of the control valves 54. Water flow through the corresponding turbine drive nozzle 54 then drives the turbine wheel 30. The motion of the turbine wheel 30 is transmitted to the wheels 11 of the carriage 10 causing it to be moved in the proper direction. As the first carriage 10 moves near a point of radial alignment with the more remote carriage 10 the tension in alignment wire 71 and control wire 56 rotates the control valve 54 to close and terminate the motion of the first carriage 10.

Damage to the irrigation system, that might otherwise be caused if control carriage 10 fails to move, is prevented by operation of the dump valve 60. The dump valve is tripped only in situations where the angular displacement of the irrigation pipe 25 with respect to the carriage 10 has reached a critical point. Under normal circumstances the prior actuation of the control valve 54 will cause the carriage 10 to move into alignment before a critical displacement is reached. However, when for some reason, such as ground obstruction or extremely slippery conditions, a carriage fails to move, the tension produced in alignment wire 71 and control wire 56 will cause the dump valve 60 to be tripped at some preset control wire 56 tension. The pressure loss caused by the opening of the dump valve will cause the pressure monitor (not shown) of the pump (not shown) to shut off the pump thereby stopping the motion of the irrigation system and preventing any structural damage. As may be seen from FIG. 6 the dump valve consists of a hollow metal cylinder 61 with a locking pressure plate 62. The metal cylinder 61 is tapped into the irrigation pipe connector 20 at its upper surface. The pressure plaate is urged against the top of the cylinder 60 by means of an adjustable screw 63 in threaded attachment with a horizontal pressure arm 67. The horizontal pressure arm is rigidly attached by conventional means to a vertical hinge arm 66 which is pivotally attached to a first hinge plate 65 welded or otherwise attached to the cylinder 60. The horizontal pressure arm 67 is held in the closed position by a notched trip lever 68 pivotally attached to a second hinge plate 69 welded or otherwise attached to the irrigation pipe connector 20. The adjustable screw 63 allows the top of the horizontal pressure arm 67 to be tightened against the notch in trip arm 68 thereby increasing the pressure required to pull the trip arm 68 away from the pressure arm 67 to release the water pressure in the cylinder 60. A lock nut 64 on the adjustable screw 63 retains the screw at the desired position. A wire or cable attached to the top of the trip arm transmits the tripping force.

The operation of a cable operated end gun 80 is shown in FIG. 9. A reciprocating high pressure end gun 80 of a type well known in the art is mounted on the end section of the irrigation line 87 and communicates with the irrigation water through a combination valve assembly 81. Water flows from the irrigation line 87 through a water actuated control valve 86 to the end gun 80 when the gun 80 is in operation. However, under normal conditions water pressure from a control water circuit 84, 85 is exerted against a diaphragm (not shown) in water actuated control valve 86 causing the valve to seat and stopping the flow of irrigation water to the end gun 80. The control water circuit 84, 85 passes through lever actuated control valve 82 which is open under normal conditions. Pressure exerted on control valve lever 83 closes the lever actuated valve 82 thereby removing control water pressure or the diaphragm of the water actuated valve 86. With the reduction of water pressure on the diaphragm of the control valve 86 the valve 86 is opened causing irrigation water flow to operate the end gun 80. A cam lever support bar 92 is rigidly mounted on swiveling piping section 91 which is pivotally attached to the center pivot 90. A first cam ring 99 with adjustable cam buttons 100 is rigidly mounted on the fixed center pivot 90. A first cam lever 93 pivotally attached to support bar 92 engages the cam ring 99 at an antifriction cap 94 mounted on the first cam lever 93. The end gun cable 88 is operably attached between control valve lever 83 and cam lever 93. The displacement caused by the cam button 100 contact with the first cam lever 93 causes the control valve lever 83 to be displaced actuating the end gun 90. By properly positioning adjustable cam buttons 100 around the cam ring 99 the end gun 90 may be programmed to spray the desired areas of the field.

A second cam ring 98 positioned above the first cam ring 99 contacts the anti friction cap 94 on a second arm lever 95 attached to the cam lever support bar 92. A cam lever extension bar 96 is horizontally attached to the second cam lever 95 and extends radially above the horizontal portion of the swivel piping section 90 for several feet. A dump valve 60 as described above is located on the swivel piping section 90 below the extension bar 96. A cam dump valve connected wire 97 is operably attached between the dump valve trip lever 68 and the horizontal extension bar 96. An adjustable termination cam button 101, as shown in FIG. 11, may be positioned at any point on the cam ring. When the cam button contacts extension arm 95, the extension arm 95 is displaced thereby tripping the dump valve 60 causing the irrigation system to be shut off, as described above. The operation of the irrigation system may be terminated at any point on the field by preselecting the position of the termination cam button 101.

It can be seen from the above that the present invention provides a number of needed improvements over existing self propelled center pivot irrigation systems. Expensive electric motors, solenoid valves, and electric alignment sensing means and the associated electrical wiring have been replaced by reliable and relatively inexpensive mechanical systems which reduce the danger of potentially fatal electrical shocks. The turbine wheel 30 as described above introduces an extremely simple and effective turbine drive system ideally adapted for use in a center pivot irrigation system. The interior placement of the turbine blades 34 protects the blades 34 and allows the curvature of the wheel 30 to be used as a momentum transfer means. In addition, the invention provides simple automatic shut off devices to prevent damage to the irrigation system and to terminate operation of the system after the desired portion of the field has been watered. The described chain drive system operates effectively in poor traction conditions associated with irrigation operations and is lighter and less expensive than conventional drive systems.

Although specific components, proportions and process steps have been stated in the above description of the preferred embodiments of the invention, other suitable materials, proportions and process steps, may be used with satisfactory results in varying degrees of quality. In addition, it will be understood that various other changes of the details, materials, steps, arrangements of parts, and uses which have been herein described and illustrated in order to explain the nature of the invention will occur to and may be made by those skilled in the art, upon a reading of this disclosure, and such changes are intended to be included within the principles and scope of this invention.

I claim:

1. An improved power means for a self-propelled center pivot irrigation system having a fixed center pivot, a radially extending distribution pipeline, means for supplying irrigation water to said pipeline, sprinkler means operably disposed along said distribution pipeline, a plurality of carriages disposed to support said pipeline at spaced intervals, each carriage being movably supported on a pair of wheels, drive means for independently moving said carriages and alignment sensing means for actuating said drive means, wherein the improvement comprises, a turbine wheel including a rim having an inner and an outer surface, and a plurality of blades attached to the inner surface of said rim, said turbine wheel being operably attached to one of said carriages, at least one high pressure nozzle means in fluid communication with said irrigation water wherein said nozzle means are operably directed toward the blades of said turbine wheel to cause rotation of said wheel in at least one direction, and means for controlling the flow of water to said nozzle means.

2. The improved power means of claim 1 further comprising a turbine wheel support frame on said one carriage, said turbine wheel being rotatably supported on said turbine wheel support frame and oriented so that the rotational axis of said turbine wheel is substantially perpendicular to the axis of rotation of the carriage wheels.

3. The improved power means of claim 2 further comprising a turbine wheel shaft fixed to said turbine wheel and rotatably supported on said turbine wheel support frame, said turbine wheel shaft being drivingly connected to a reduction gear box having an output shaft, said drive means drivingly connecting said output shaft to the carriage wheels.

4. A self-propelled center pivot irrigation system having a fixed center pivot, a radially extending distribution pipeline, means for supplying irrigation water to said pipeline, sprinkler means operably disposed along said distribution pipeline, a plurality of carriages disposed to support said pipeline at spaced intervals, each carriage being movably supported on a pair of wheels, drive means for independently moving said carriages and alignment sensing means for actuating said drive means, said drive means comprising
- a chain drive belt substantially encircling and contacting both wheels of said moveable carriage at the outer rim of said wheels,
- positioning means on said rims of said wheels for guiding said chain drive belt,
- a drive sprocket means drivingly engaging said chain drive belt,
- a turbine wheel including a rim having an inner and an outer surface and a plurality of blades attached to the inner surface of said rim,
- means for rotatably supporting said turbine wheel on said carriage,
- at least one high pressure nozzle means in fluid comminication with said irrigation water wherein said nozzle means are operably directed toward the blades of said turbine wheel to cause rotation of said wheel in at least one direction, means for controlling the flow of water to said nozzle means, and
- mean drivingly connecting said turbine wheel to said drive sprocket means.

5. The center pivot irrigation system of claim 4 wherein said means drivingly connecting said turbine wheel to said drive sprocket means comprises a single reduction gear box.

* * * * *